(12) United States Patent
Tsunoda

(10) Patent No.: US 7,609,026 B2
(45) Date of Patent: Oct. 27, 2009

(54) CHARGING DEVICE AND CHARGING METHOD

(75) Inventor: Naotaka Tsunoda, Tokyo (JP)

(73) Assignee: Sony Corporation, Tokyo (JP)

( * ) Notice: Subject to any disclaimer, the term of this patent is extended or adjusted under 35 U.S.C. 154(b) by 507 days.

(21) Appl. No.: 10/524,108

(22) PCT Filed: Sep. 11, 2003

(86) PCT No.: PCT/JP03/11653

§ 371 (c)(1),
(2), (4) Date: Feb. 10, 2005

(87) PCT Pub. No.: WO2004/025804

PCT Pub. Date: Mar. 25, 2004

(65) Prior Publication Data

US 2005/0212479 A1  Sep. 29, 2005

(30) Foreign Application Priority Data

Sep. 13, 2002 (JP) .............................. 2002-268110

(51) Int. Cl.
*H02J 7/00* (2006.01)
*H04R 25/00* (2006.01)

(52) U.S. Cl. ...................................... 320/114; 381/370

(58) Field of Classification Search ................ 320/101, 320/103, 107, 108, 114, 115, 111, 112, 113; 381/370, 374, 376, 385
See application file for complete search history.

(56) References Cited

U.S. PATENT DOCUMENTS

| 4,027,113 A | * | 5/1977 | Matsumoto et al. ......... 381/378 |
| 4,229,829 A | * | 10/1980 | Grunwald ................... 398/122 |
| 4,845,751 A | * | 7/1989 | Schwab ...................... 381/311 |
| 4,930,148 A | * | 5/1990 | Lee .......................... 455/575.2 |
| 5,095,382 A | * | 3/1992 | Abe .......................... 398/202 |
| 5,621,458 A | * | 4/1997 | Mann et al. ............... 348/231.5 |
| 6,236,969 B1 | | 5/2001 | Ruppert et al. |
| 6,978,163 B2 | * | 12/2005 | Dyer et al. ............... 455/575.2 |

(Continued)

FOREIGN PATENT DOCUMENTS

JP           09-223521           8/1997

(Continued)

*Primary Examiner*—Edward Tso
*Assistant Examiner*—M'Baye Diao
(74) *Attorney, Agent, or Firm*—Oblon, Spivak, McClelland, Maier & Neustadt, L.L.P.

(57) ABSTRACT

Charging a secondary battery (39) provided within wireless headphones (15) is carried out in a reliable manner by a charger (16) when the wireless headphones (15) are not in use. An engaged section (30) and electrodes (31) are provided at the bottom portion of a case (20) of the headphones (15). An engaging section (37) constituted by a pawl and a contact member (38) is provided on a receptacle surface (36) of a supporting plate (35) on the side of the battery charger (16). In the event that the headphones (15) are then mounted on the battery charger (16) so that the engaged section (30) is engaged by the engaging section (37) on the side of the battery charger (16), the electrodes (31) of the headphones (15) are press-attached against the contact members (38) on the side of the battery charger (16) as a result of the leverage principle.

11 Claims, 8 Drawing Sheets

U.S. PATENT DOCUMENTS

2003/0210801 A1* 11/2003 Naksen et al. ............. 381/370
2003/0231001 A1* 12/2003 Bruning ..................... 320/108

FOREIGN PATENT DOCUMENTS

| JP | 2770389 | 4/1998 |
| JP | 2000-253592 | 9/2000 |
| JP | 2000-299941 | 10/2000 |

* cited by examiner

CHARGING DEVICE AND CHARGING METHOD

TECHNICAL FIELD

The present invention relates to a charging device and charging method, and particularly relates to a charging device and charging method where an apparatus with a secondary battery built-in is mounted on a battery charger so as to charge the secondary battery.

BACKGROUND ART

As shown in FIG. 9, in Japanese Patent Publication No. 2770389 (patent document 1), a charging device comprising wireless headphones 1 and a transmission device 2 is disclosed. An engaging recess 3 is formed at an upper end of a cabinet of a transmission device 2. The dimensions of this engaging recess 3 are substantially the same as the width of a hanger section 4 of the headphones 1 so as to receive a protruding section 5 at a substantially central portion of the hanger section 4.

When the headphones 1 are mounted on the transmission device 2 so that the protruding section 5 of the hanger section 4 inserts into the engaging recess 3, pins 6 erected at the engaging recess 3 are inserted to within holes 7 of the protruding section 5 so as to make contact with electrodes within the holes 7. In this way, a secondary battery 8 provided within the headphones 1 is charged by a power supply circuit on the side of the transmission device 2.

Here, light-emitting elements 9 are provided at the transmission device 2 and light-receiving elements 10 are provided at the headphones 1. Therefore, after the secondary battery 8 of the headphones 1 is charged by this transmission device 2, while the headphones are detached for use, it is possible for signals to be transmitted to the light-receiving elements 10 of the headphones 1 from the light-emitting elements 9 of the transmission device 2 using infrared rays etc. It is therefore possible for audio to be played back using the headphones 1 without employing a signal cable (refer to patent document 1).

Further, in Japanese Utility Model Laid-open Publication No. H7-22955 (Japanese Patent Publication 2), there are disclosed wireless headphones employing a secondary battery as an operation power supply. It is then possible to open and close charging terminals for charging the secondary battery using an opening and closing body interlocking with an operation section of a switch for switching over the operating state of the headphones. This makes it possible to prevent hair and skin from making contact with the charging terminals by opening and closing the charging terminals using the opening and closing body when the headphones are worn on a person's head and therefore prevent corrosion of and defective contact with the charging terminals.

It is preferable for the operation of charging wireless headphones with a secondary battery built-in to be straightforward. Patent document 1 and patent document 2 described above disclose charging devices where the secondary battery does not have to be removed from the headphones where charging is possible as a result of mounting the headphones on the battery charger. With these charging devices of the related art, charging is carried out by making contact between charging pins 6 and electrodes as a result of utilizing the weight of the headphones 1. It is therefore not possible to ensure a contact pressure that is greater than the dead weight of the headphones. This has the disadvantage that the connection of the pins 6 is not always stable. There is also a problem that fine adjustment is necessary in order to correctly line up the positions of the terminals on the headphone side and the pins on the side of the battery charger during the charging operation.

In order to resolve the aforementioned problems, it is advantageous for the present invention to provide a charging device capable of ensuring sufficient connection pressure in excess of the weight of wireless apparatus such as headphones etc. that does not require fine adjustment in order for electrodes to make appropriate contact with a connection member.

DISCLOSURE OF THE INVENTION

A primary aspect of the invention of the application relates to a charging device where apparatus with a secondary battery built-in is mounted on a battery charger and charging of the secondary battery is performed, characterized by an engaging section and a contact member provided on the battery charger side, and electrodes provided on apparatus side for supplying power to the secondary battery upon the engaged section engaging with the engaging section and the contact member making contact. In the event that the apparatus is mounted on the battery charger so as to be engaged as a result of engaging the engaged section and the engaging section, the electrodes are press-attached against the contact member with a force greater than the weight of the apparatus due to angular moment centered about the engaging section of the apparatus due to the weight of the apparatus. This may include apparatus where a secondary battery is built-into the apparatus in such a manner that changing of the battery is not possible or apparatus where storage is such that the built-in secondary battery can be changed.

In the event that the apparatus is mounted on the battery charger so that the engaging section engages with the engaged section, it is preferable for the electrodes to make contact with the contact members at a position between a perpendicular line passing through the center of gravity of the apparatus and the engaging section. Further, it is also preferable for the receptacle surface of the battery charger to form substantial circular arc shapes so that when the apparatus is made to rotate at the receptacle surfaces so that the engaged section is engaged by the engaging section, the electrodes are stopped at a position where contact is made with the contact members.

Moreover, it is also preferable for the battery charger to be provided with wireless transmission means and for the apparatus to be provided with wireless receiving means so that the receiving means of the apparatus and the output means supplied with the output of the receiving means are driven by the secondary battery while the apparatus is removed from the battery charger when in use. It is also preferable for signals to be transmitted between the transmission means and the receiving means using infrared rays. In this event, it is preferable to provide an infrared generator at the battery charger and to provide an infrared receiver at the apparatus. It is also preferable for the apparatus to be wireless headphones. Further, it is also desirable for the cases for the output units of the headphones to be substantially circular or oval in shape so that the outer peripheries of the cases rotate along the substantially circular arc-shaped receptacle surfaces of the battery charger so as to be stably supported at a position where the engaged portions are engaged by the engaging portions.

A further important aspect of the invention of this application relates to a charging device provided with apparatus employing wireless communication, and a battery charger serving a dual purpose of a mounting table for mounting the apparatus when the apparatus is not in use. Receiving means for receiving signals in a wireless manner are provided on the side of the apparatus. Transmitting means for transmitting signals to the apparatus in a wireless manner are provided on the side of the battery charger. Electrodes and an engaged section are provided on the side of the apparatus, and contact members and engaging section are provided on the side of the battery charger. In the event that the apparatus is mounted on the battery charger so that the engaged section engages with the engaging section, the electrodes are pushed against the contact members due to angular moment taking the position of engagement of the engaged section and the engaging section as a fulcrum due to the weight of the apparatus.

It is also preferable for the electrodes to be provided at the lower portion of the apparatus so that in the event that the apparatus is mounted on the battery charger, the electrodes are press-attached against the facing contact members provided on the receptacle surfaces of the battery charger.

A further important aspect of the invention relates to a charging method where apparatus with a secondary battery built-in is mounted on a battery charger and charging of the secondary battery is performed, characterized by an engaging section and contact members being provided on the side of the battery charger, and electrodes for supplying power to the secondary battery upon engaged sections engaging with the engaging section and the contact members making contact. In the event that the apparatus is mounted on the battery charger so that the engaged section is engaged by the engaging section, the electrodes are press-attached against the contact members with a force greater than the weight of the apparatus due to angular moment centered about the engaging section of the apparatus due to the weight of the apparatus, so that power is supplied via the contact members and the electrodes so as to charge the secondary battery.

In the event that the apparatus is mounted on the battery charger so that the engaging section engages with the engaged section, it is desirable for the electrodes to make contact with the contact members at a position between a perpendicular line passing through the center of gravity of the apparatus and the engaging section.

A preferred embodiment of the invention incorporated in the application also comprises a headphone system comprising a battery charger, with headphones having a secondary battery or other chargeable power supply built-in, and has support sections for fixing the headphones when the headphones are mounted on the battery charger. Engaging mechanisms for preventing the headphones from falling due to rotation of body housing sections are provided at corresponding portions on both sides. Electrical contact points are then positioned between the engaging mechanism and the position of the center of gravity of the headphones while fixed to the battery charger when viewed from a horizontal direction.

The headphone system of the above embodiment may be a wireless headphone system employing infrared transmission. It is also possible for the battery charger and the transmitter of the wireless headphone system to be combined. A wireless headphone system employing electromagnetic transmission in place of infrared transmission is also possible in the above embodiment. It is also possible for the battery charger and the transmitter of the wireless headphone system of the above embodiment to be integrated. A headset system capable of two-way communication employing the above structure is also preferable. In the case of a headphone system capable of two-way communication, it is appropriate for information such as charge remaining in the secondary battery to be sent from the headphones to the battery charger side.

The above configuration may be employed in recording or playback of audio, or in headphone systems having two-way functions.

The headphone device of the aforementioned embodiment ensures sufficient contact pressure for electrical contacts during charging and is capable of reliable connections. Making the shapes of the supporting sections of the battery charger similar to the shape of the headphones is effective in making fixing of the headphones straightforward.

BEST MODE FOR CARRYING OUT THE INVENTION

Figure 1:
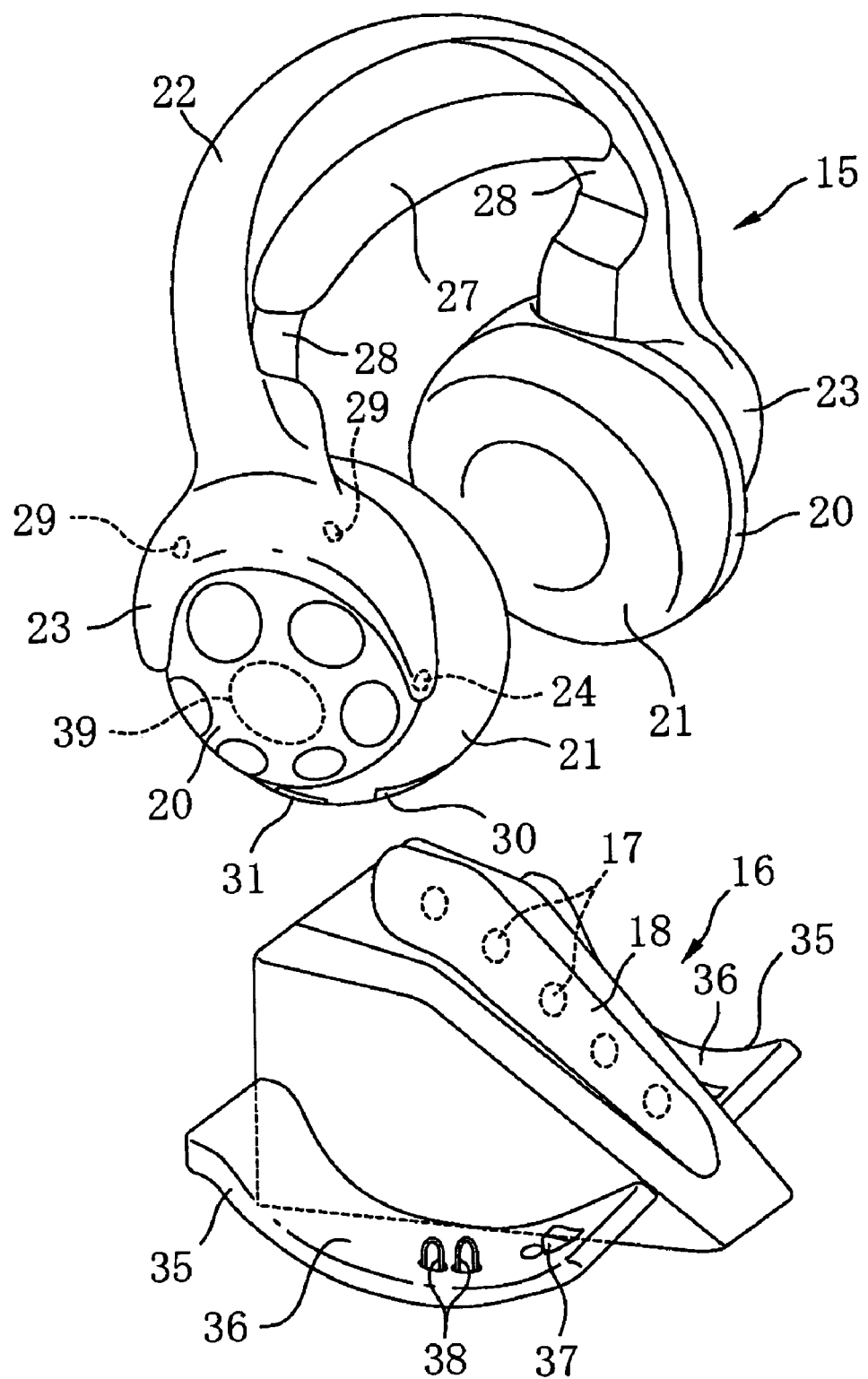
FIG. 1 is an exploded perspective view showing a charging device using a battery charger.

The following is a description of preferred embodiments of the present invention incorporated in this application. FIG. 1 to FIG. 6 are views showing a wireless headphone charging device of a first embodiment of this application. First, a description is given of structural characteristics using FIG. 1 to FIG. 3.

The charging device is comprised of wireless headphones 15 and a battery charger 16 for charging the headphones 15. The battery charger 16 also serves a dual purpose as the transmission means, with a plurality of infrared light-emitting elements 17 being arranged in a row at an upper portion of the front surface side at a central portion of this box. The infrared light emitting elements 17 are constructed from diodes emitting infrared rays and are covered by a cover 18.

The headphones 15 are equipped with a pair of flat, plate-shaped cases 20 constituting an output unit. The cases 20 are substantially circular or oval as viewed from the side, with pads 21 being fitted to portions on the sides making contact with the ears. The pair of cases 20 is also linked together by a hanger 22. Both ends of the hanger 22 then form arms 23 splitting into two, with the cases 20 being supported in a manner so as to swing freely supported at fulcrums 24 of the arms 23.

A pressing section 27 pressing the top of a person's head is arranged at the lower side of the hanger 22. The pressing section 27 is connected to portions at both ends of the hanger 22 by a retractable connecting belt 28 projecting from both ends. Respective pairs of light-receiving elements 29 are housed in the arms 23 of the hanger 22.

A recess 30 constituting an engaged section is formed at an outer peripheral surface at a lower end side of one of the left and right pair of cases 20 of the headphones 15, for example, at the left side case 20. A pair of electrodes 31 is then formed at positions offset in a circumferential direction with respect to the recess 30.

Supporting plates 35 bent respectively in the shape of circular arcs are provided on both sides of a battery charger 16 on which the cases 20 constituting output units of the headphone 15 are mounted, with the upper surfaces of the supporting plates 35 constituting receptacle surfaces 36. The radius of curvature of the arc in which the receptacle surfaces 36 curve is a value slightly larger than the radii of the cases 20 so as to ensure that the surfaces of the cases 20 of the output units can rotate smoothly along on the receptacle surfaces 36. An engaging section 37 constituted by a pawl is provided so as to project from a receptacle surface 36, with pairs of contact members 38 being provided at positions to the rear of the pawl of the engaging section 37. Charging of a secondary battery 39 on the side of the headphones 15 is then carried out as a result of the contact members 38 making contact with electrodes 31 of the cases 20 of the headphones 15.

Figure 4:
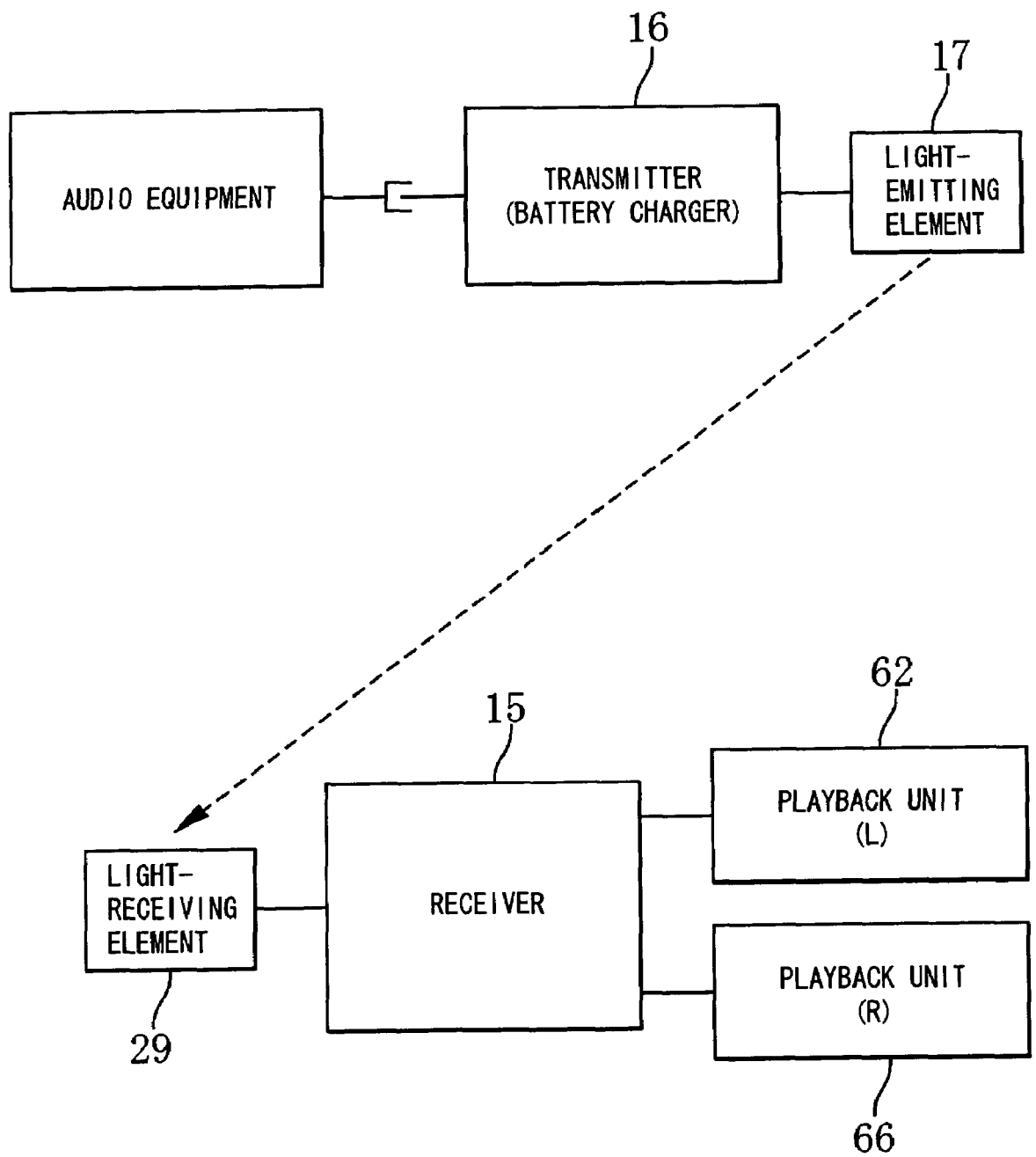
FIG. 4 is a block view showing a system for transmitting and receiving signals in a wireless manner.

A wireless headphone device is therefore configured from the battery charger 16 and the headphones 15. Namely, as shown in FIG. 4, a transmitter 16 of the battery charger constituting the transmitter is connected to audio apparatus and the light-emitting elements 17 of the transmitter 16 generate infrared rays. When the infrared rays are then received by the light-receiving elements 29 of the receiver constituted by the headphones 15, the receiver 15 demodulates and amplifies the received signal so as to drive the playback units 62 and 66.

Figure 5:
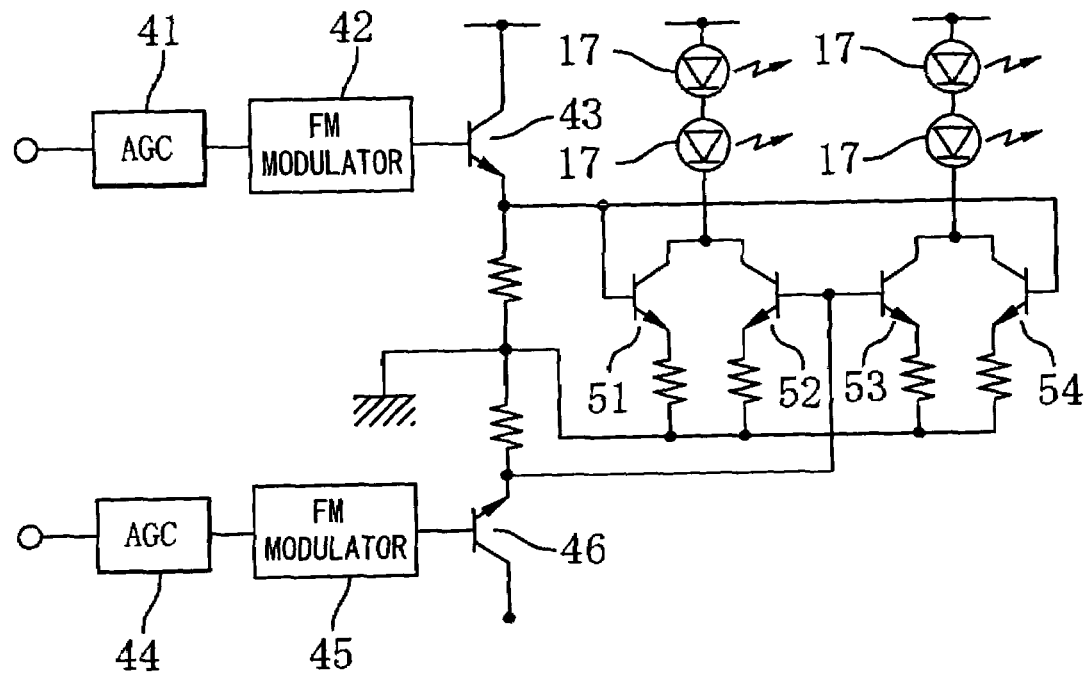
FIG. 5 is a circuit diagram of a transmission circuit of battery charger.

FIG. 5 shows the electrical configuration on the side of the battery charger 16 generating signals using infrared rays. Here, an automatic gain control (AGC) circuit 41 is connected to a signal terminal on the left side, the AGC circuit 41 is further connected to an FM modulator 42, and an output terminal of the FM modulator 42 is connected to the base of a transistor 43. An AGC circuit 44 is connected to a right-side signal terminal, and an output terminal of the AGC circuit 44 is connected to an FM modulator 45. An output terminal of the FM modulator 45 is connected to the base of a transistor 46.

An emitter of the transistor 43 is connected to the bases of transistors 51 and 54, and the emitter of the transistor 46 is connected to the bases of transistors 52 and 53. Collectors of the transistors 51 and 52 are connected in series to series circuits (cathode side) of pairs of infrared light-emitting elements 17. Further, collectors of the transistors 53 and 54 are also connected in series to series circuits (cathode side) of pairs of infrared light-emitting elements 17.

Figure 6:
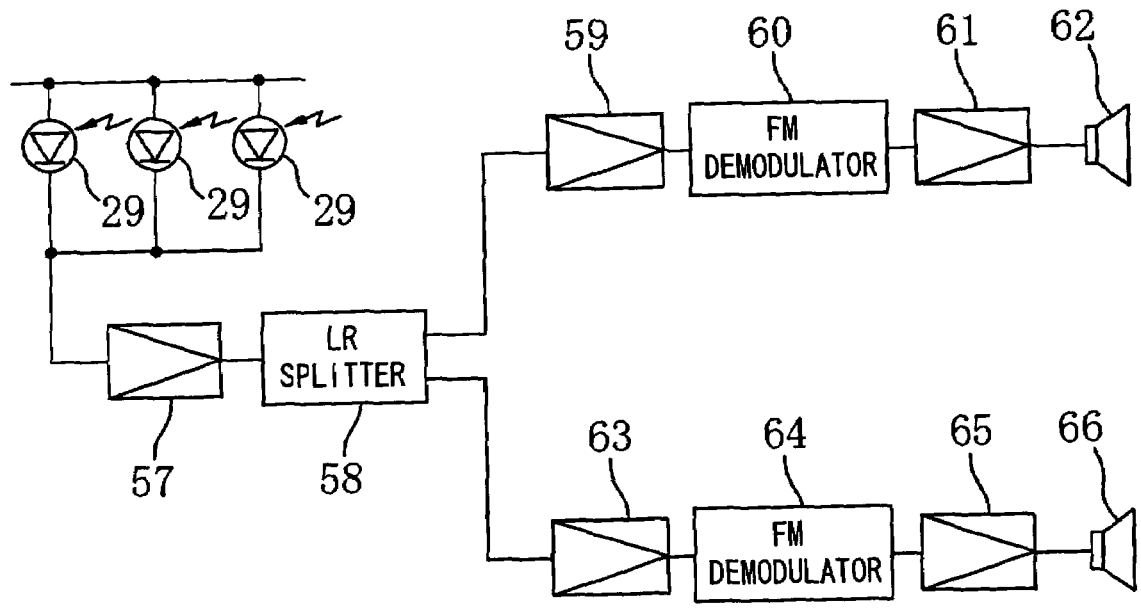
FIG. 6 is a circuit diagram of a receiving circuit on the headphone side.

Next, as shown in FIG. 6, the receiving circuit on the side of the headphones 15 is equipped with an amplifier 57 connected to a parallel circuit of the phototransistors 29 for signal receiving use, with the amplifier 57 in turn being connected to an LR splitter 58. An output terminal of the left side channel of the LR splitter 58 is connected to an amplifier 59, and an output of the amplifier 59 is connected to an FM demodulator 60. An output terminal of the FM demodulator 60 is connected to the playback unit 62 via an output amplifier 61. A converter configures the playback unit 62 of the left side of the headphones 15.

An output terminal of the right side channel of the LR splitter 58 is connected to the amplifier 63. An output terminal of the amplifier 63 is then connected to an FM demodulator 64. The output side of the FM demodulator 64 is connected to the playback unit 66 via an output amplifier 65. A converter configures the playback unit 66 of the right side of the headphones 15.

Figure 2:
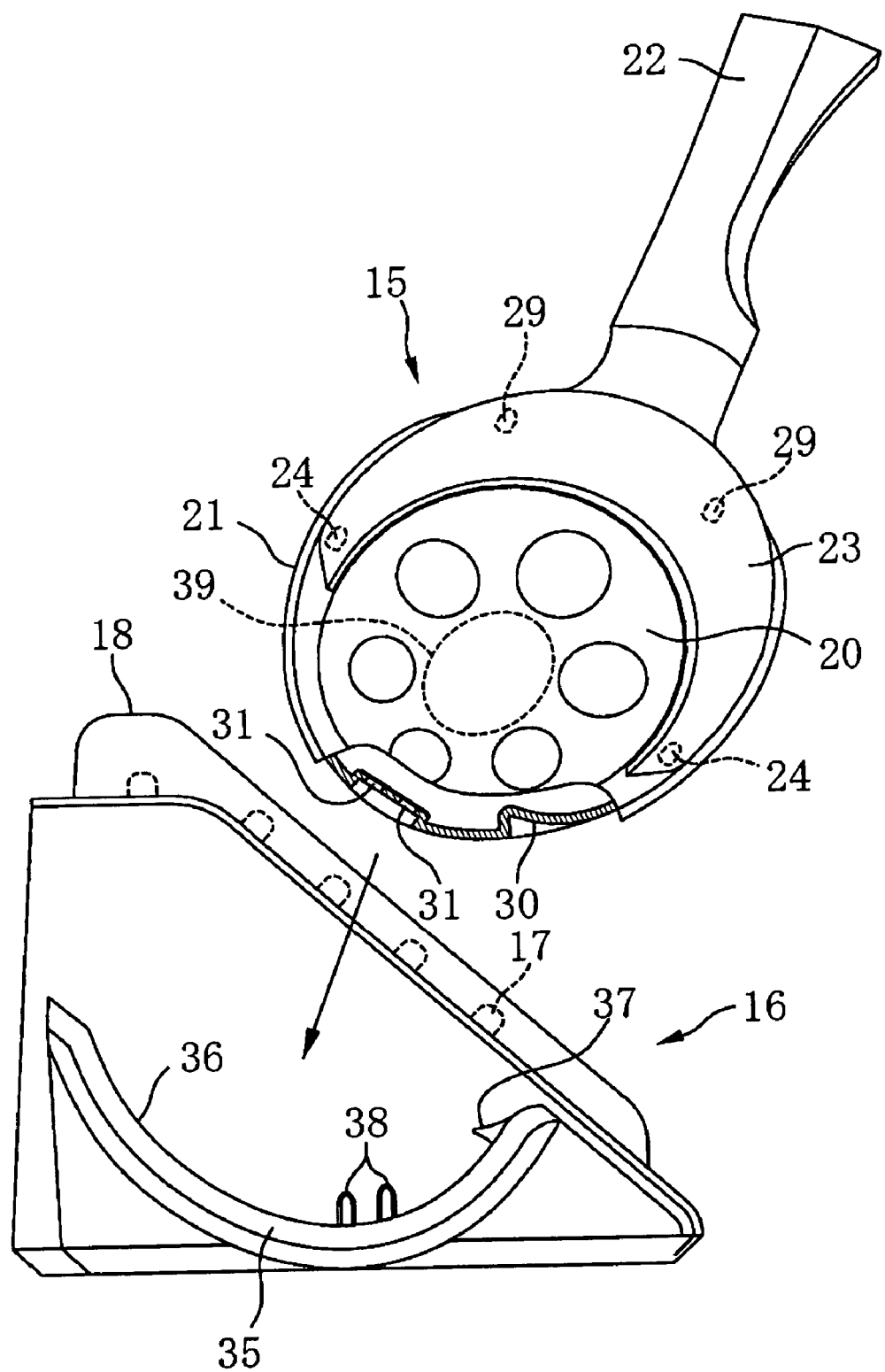
FIG. 2 is a side view showing an operation for installing a headphone.

A description is now given of the charging operation of the charging device of the configuration described above. As shown in FIG. 1 and FIG. 2, the headphones 15 are mounted on the battery charger 16. The pair of cases 20 connected by the hanger 22 as described above are provided at the headphones 15, and the cases 20 are mounted on the receptacle surfaces 36 of the supporting plates 35 on both sides of the battery charger 16. At this time, as shown in FIG. 2, the headphones 15 are mounted on the battery charger 16 in such a manner that the portions at the sides of the lower ends of the left and right casings 20 where the electrodes 31 are provided are positioned to the rear sides of the contact members 38 of a receptacle surface 36 of the battery charger 16.

Figure 3:
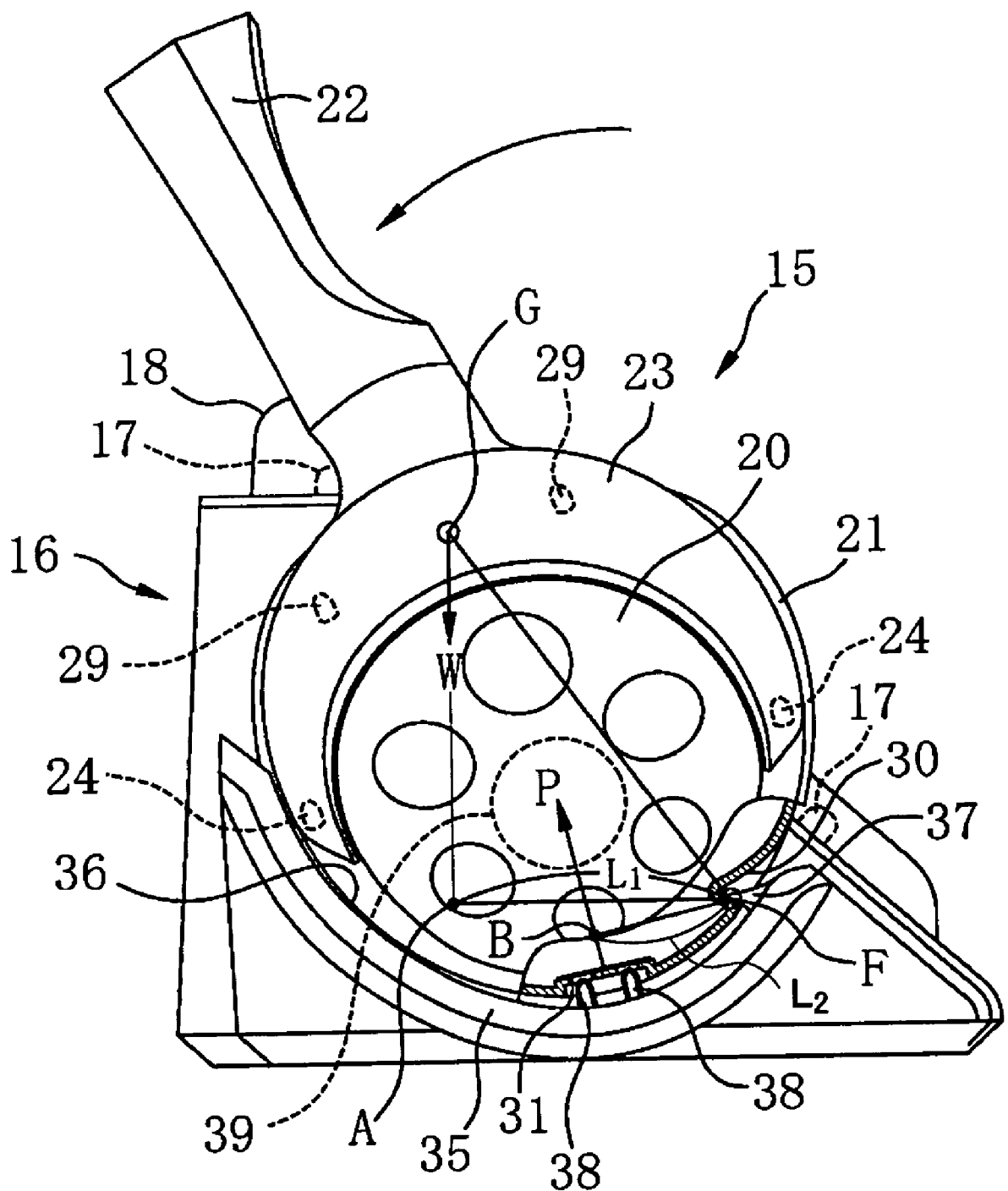
FIG. 3 is a side view showing a state of contact between electrodes and contact members in the event of installation.

As shown in FIG. 3, casings 20 of the headphones 15 are then made to rotate in a counterclockwise direction along the circular arc-shaped surfaces on the receptacle surfaces 36 bent in circular arcs of the supporting plates 35 of the battery charger 16. In doing so, the engaged section 30 at the lower end of the casing 20 of the headphones 15 engages with the pawl 37 of a receptacle surface 36 of the battery charger 16. At this event, the electrodes 31 on the side of the casing 20 are stopped in a state of contact with the contact members 38 of the battery charger 16 as shown in FIG. 3. Namely, the electrodes 31 of the headphones 15 and the contact members 38 of the battery charger 16 are connected to each other. Power is therefore supplied to the secondary battery 39 of the headphones 15 from the power supply circuit provided within the battery charger 16 via the contact members 38 and the electrodes 31 so that the secondary battery 39 is charged.

According to the leverage principle, the electrodes 31 on the side of the headphones 15 and the contact members 38 of the battery charger 16 are press-attached together during the charging operation with a force of a magnitude greater than the weight of the headphones 15. This theory is described in the following.

Now, the center of gravity of the headphones 15 is taken to be G in FIG. 3, and an engagement point of an engaged section 30 constituting the fulcrum of the rotation action of the headphones 15 and an engaging section 37 is taken to be F. A point of intersection of a perpendicular line from G and a horizontal line passing through F is then taken to be A, and a reaction force exerted by the headphones 15 coming from the battery charger 16 at a point at a central portion of the pair of electrodes 31 is taken to be P. A perpendicular extremity going downwards from F with respect to P is taken to be B. A distance between F and A is taken to be L1, and a distance between F and B is taken to be L2.

Angular moment due to weight W of the headphones 15 acting on the center of gravity G attempting to cause rotation in an counterclockwise direction taking F as center is taken to be W·L1. With regard to this, at point B, the headphones 15 are subjected to a rotational force in a clockwise direction due to the reaction force P incurred by the electrodes 31. This force is P·L2. Namely, the headphones 15 are subjected to a moment P·L2 attempting to rotate the headphones 15 in a clockwise direction taking F as center. However, the headphones are stopped at the angle shown in FIG. 3. This is therefore balanced by a moment in the opposite direction taking F as center. As a result, the next equation holds true.

$$W \cdot L1 = P \cdot L2$$

And, therefore, P=W·L1/L2. As becomes clear from FIG. 3, P becomes a value larger than W because L1 is larger than L2. The contact pressure between the electrodes 31 and the contact members 38 is therefore a value larger than the weight of the headphones 15. The electrodes 31 of the headphones 15 and the contact members 38 of the battery charger 16 therefore make contact in a more reliable manner with a stronger force due to the so-called the leverage principle.

Next, a description is given of the in-use operation of the transmission device constituted by the battery charger 16 and the headphones 15. The battery charger 16 shown in FIG. 4 serves a dual purpose as a transmitter so that a signal taking infrared rays (the arrow of the dotted line) as a medium is supplied to the headphones 15 in a wireless manner by the light-emitting elements 17. The headphones 15 then receive this signal using the light-receiving elements 29, left and right audio signals are played back by the receiving circuit provided at the center of the headphones, and playback units 62 and 66 are driven. The person wearing the headphones 15 can therefore listen to audio in a wireless manner.

An audio signal is supplied to left and right input terminals of the receiving circuit of the battery charger 16 as shown in FIG. 5. The left and right audio signals are supplied to the FM modulators 42 and 45 via the AGC circuits 41 and 44 where the left and right audio signals are FM-modulated. The FM-modulated outputs are then supplied to transistors 43 and 46 constituting buffers. The transistor 43 controls the base current of transistors 51 and 54 and the transistor 46 controls the base current of the transistors 52 and 53. The transistors 51 to 54 are connected to series circuits of infrared light-emitting elements 17. An infrared signal that is the left and right audio signals FM-modulated as a result of the conduction of the transistors 51 to 54 is therefore generated by the light-emitting elements 17. It is preferable for carrier waves of the FM modulators 42 and 45 FM modulating the left and right audio signals to be different.

Light generated by the infrared light-emitting elements 17 of the battery charger 16 passes through the cover 18 so as to be received by the light-receiving elements 29 of the headphones 15. As shown in FIG. 6, current detected by the light-receiving elements 29 is amplified by the amplifier 57 and split into FM-modulated signals corresponding to the left and right audio signals by the LR splitter 58. The divided signals are then amplified by the amplifiers 59 and 63, and demodulated to audio signals by the FM demodulators 60 and 64. The demodulated audio signals are then amplified by the amplifiers 61 and 65 and drive the playback units 62 and 66 constituted by converters. Playback of the audio signal is therefore carried out as a result.

Figure 7:
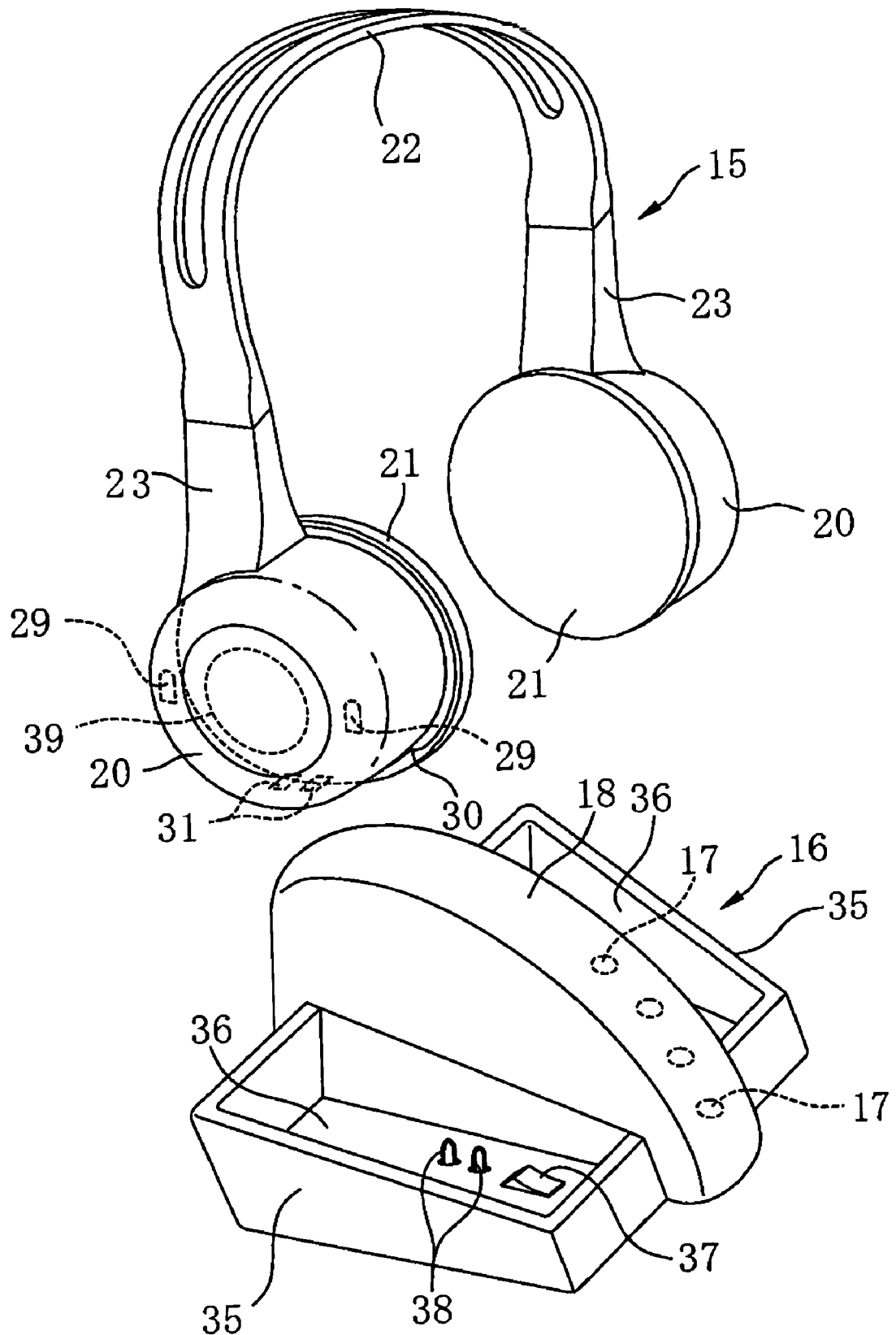
FIG. 7 is an exploded perspective view showing a further embodiment of an operation for installing headphones.
Figure 8:
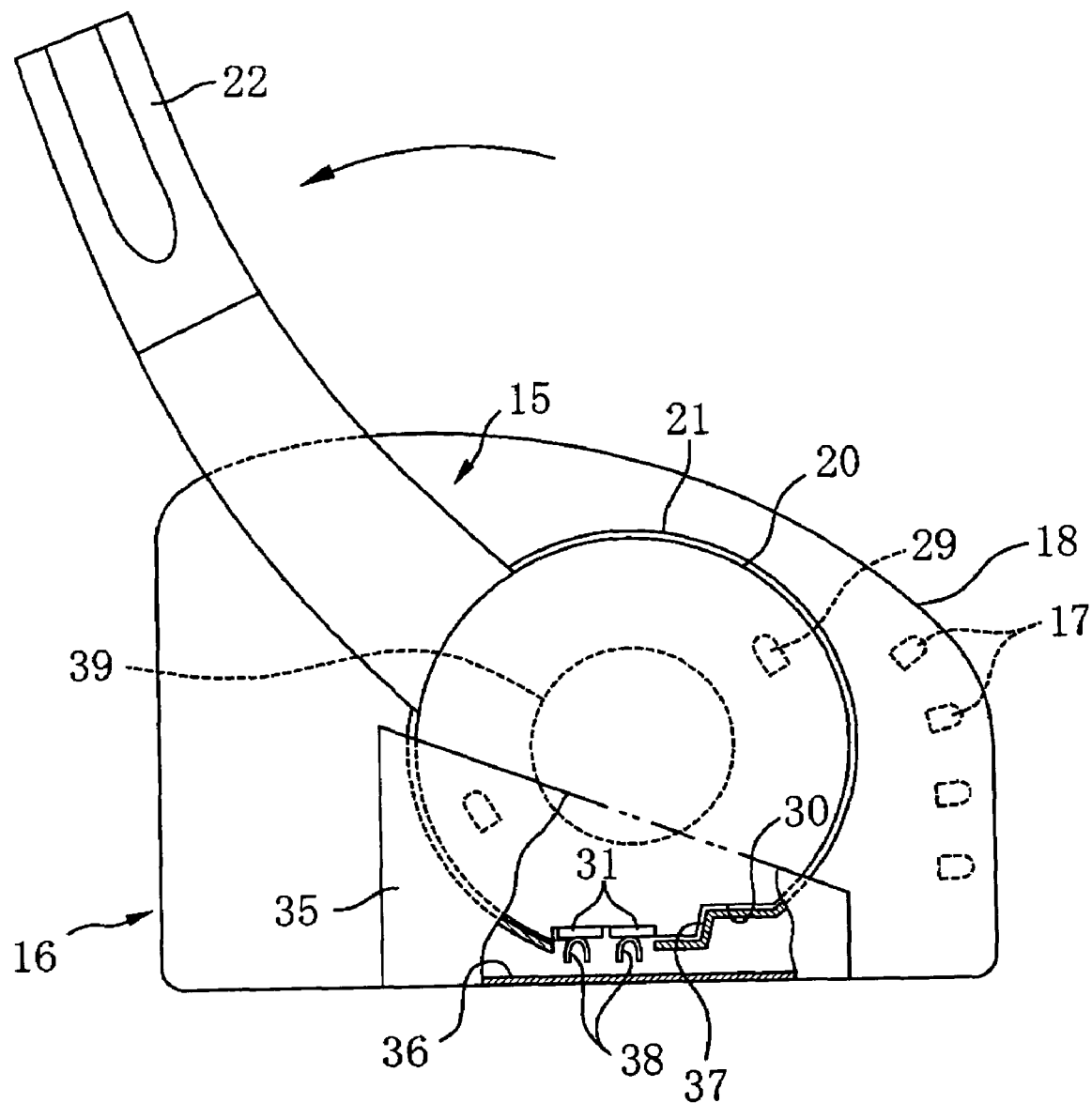
FIG. 8 is a side view of the state when installation of headphones is complete.
Figure 9:
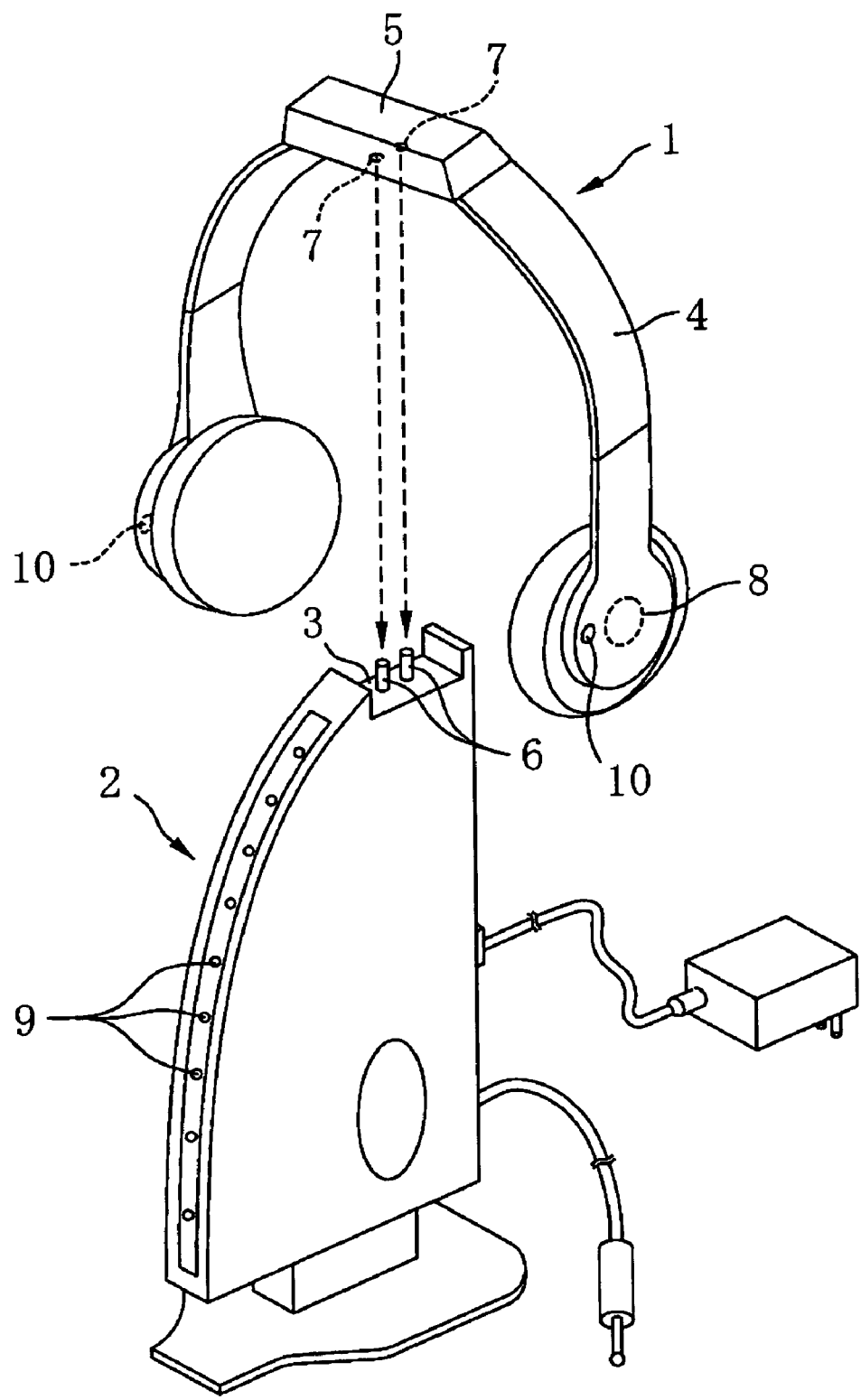
FIG. 9 is an exploded perspective view showing a charging device for a secondary battery for headphones of the related art.

Next, a description is given of further embodiments using FIG. 7 and FIG. 8. The charging device of this embodiment is also constructed from headphones 15 and a battery charger 16. Here, the headphones 15 are such that arms 23 at both ends of the hanger 22 are fitted directly to the cases 20 of the output units. It is therefore not possible to swing the cases with respect to the arm 23. In other words, the angle of the headphones with respect to the ears is adjusted by the extent of deformation of the hanger 22. With this kind of structure, the headphones 15 are one size smaller in comparison with the headphones (refer to FIG. 1 to FIG. 3) of the first embodiment.

On the other hand, the battery charger 16 is equipped with irregular-shaped box-type supporting plates 35 on both sides, with bottom surfaces of these supporting plates 35 constituting receptacle surfaces 36. Moreover, the engaging section 37 constituted by a pawl and contact members 38 are provided at a receptacle surface 36. The engaging section 37 engages with the engaged section 30 on a side of the headphones 15 and the contact members 38 make contact with electrodes 31 on the side of the headphones 15.

The headphones 15 are therefore such that the cases 20 can easily be housed within the supporting plates 35 so that when the headphones in this state are rotated in an counterclockwise direction as shown by the arrow in FIG. 8, the recesses 30 provided at the bottom portions of the cases 20 of the headphones 15 engage with the engaging section 37 on the receptacle surfaces 36 of the supporting plates 35 of the battery charger 16. At this time, at the same time, electrodes 31 on the side of the headphones 15 are press-attached onto the contact members 38 at the sides of the battery charger 16. This pressing-on operation is due to angular moment generated by gravitational force passing through the center of gravity of the headphones 15 taking the engaging section 37 as center. This means that the electrodes 31 are pushed onto the contact members 38 with a pressing force that is larger than the pressing force due to the weight of the headphones 15. It is therefore possible in the above embodiment to attain the same operational effects as for the first embodiment described above.

In the above, a description is given of the invention incorporated in this application using preferred embodiments as shown in the drawings but the invention incorporated in this application is by no means limited to the above preferred embodiments, and various modifications are possible while still remaining within the scope of the technological concept of the invention incorporated in this application. For example, the headphones 15 and the battery charger 16 of the above embodiments transmit and receive signals in a wireless manner using infrared rays. It is also possible to transmit and receive signals using electromagnetic radiation rather than infrared rays. Further, the battery charger 16 charges a secondary battery 39 of the headphones but this is by no means limited to headphones 15 and a broad range of applications to charging secondary batteries of various other types of apparatus operating in a wireless manner.

INDUSTRIAL APPLICABILITY

A primary aspect of the invention of the application is a charging device where apparatus with a secondary battery built-in is mounted on a battery charger and charging of the secondary battery is performed. Here, engaging sections and contact members are provided on the side of the battery charger, and electrodes for supplying power to the secondary battery upon engaged sections engaging with the engaging sections and the contact members making contact. In the event that the apparatus is mounted on the battery charger so that the engaged sections and the engaging sections engage, the electrodes are press-attached against the contact members with a force greater than the weight of the apparatus due to angular moment centered about the engaging sections of the apparatus due to the weight of the apparatus.

According to such charging device, angular moment due to the weight of the apparatus is therefore utilized in the contacting of the electrodes and the contact members. This means that the electrodes make contact with the contact members in a reliable manner with a pressing force greater than the case where just the weight is used, so as to bring about a more stable charging operation.

The invention claimed is:

1. A charging apparatus for charging a secondary battery when mounting an apparatus having a built-in secondary battery on a battery charger, the charging apparatus comprising:

the battery charger comprising an engaging section and a contact member; and an electrode for supplying power to the secondary battery upon establishing contact between an engaged section engaging with the engaging section and the contact member, wherein when the apparatus is mounted on the battery charger so as to engage the engaged section with the engaging section, the electrode is press-attached against the contact member with a force greater than a weight of the device due to an angular moment centered about the engaging section of the apparatus due to the weight of the apparatus, and a receptacle surface of the battery charger forms a substantial circular arc shape wherein the engaged section is engaged by the engaging section when the apparatus is turned on the receptacle surface, and the electrode stops at a position where contact is made with the contact member.

2. The charging device according to claim 1, characterized in that, if the engaging section engages with the engaged section when the apparatus is mounted on the battery charger, the electrode makes contact with the contact member at a position between a perpendicular line passing through a center of gravity of the apparatus and the engaging section.

3. The charging device according to claim 1, characterized in that the battery charger is provided with a wireless transmission means and the apparatus is provided with wireless receiving means, wherein the receiving means of the apparatus and an output means supplied with an output of the receiving means are driven by the secondary battery when the apparatus is removed from the battery charger for use.

4. The charging device according to claim 3, characterized in that a signal is transmitted between the transmission means and the receiving means by infrared ray.

5. The charging device according to claim 4, characterized in that an infrared generator is provided at the battery charger and an infrared receiver is provided at the apparatus.

6. The charging device according to claim 1, characterized in that the apparatus is wireless headphone.

7. The charging device according to claim 6, characterized in that an output unit case of the headphone has a substantially circular or oval shape so that the outer peripheries of the case rotate along the substantially circular arc-shaped receptacle surface of the battery charger so as to be stably supported at a position where the engaged portions are engaged by the engaging portions.

8. A charging device provided with an apparatus employing wireless communication, and a battery charger serving a dual purpose of a mounting table for mounting the apparatus when the apparatus is not in use, the charging device characterized by:

the apparatus comprising a receiving means for receiving a signal in a wireless manner and the battery charger comprising a transmitting means for transmitting signals to the apparatus in a wireless manner;

the apparatus comprising an electrode and an engaged section, and the battery charger comprising a contact member and engaging section, wherein when the apparatus is mounted on the battery charger so that the engaged section engages with the engaging section, the electrode is pushed against the contact member with a force greater than a weight of the apparatus due to an angular moment taking a position of engagement of the engaged section and the engaging section as a fulcrum due to the weight of the apparatus.

9. The charging device according to claim 8, characterized in that an electrode is provided at a lower portion of the apparatus, wherein if the apparatus is mounted on the battery charger, the electrode is press-attached against a contact member provided on a receptacle surface of the battery charger.

10. A charging method for charging a secondary battery when mounting an apparatus having a built-in secondary battery on a battery charger, characterized by:

providing an engaging section and a contact member on the battery charger side; and providing an electrode for supplying power to the secondary battery by engaging the engaging section and the contact member by the engaged section at the apparatus side; wherein when the apparatus is mounted on the battery charger so as to engage the engaged section with the engaging section, the electrode is press-attached against the contact member with a force greater than a weight of the device due to an angular moment centered about the engaging section of the apparatus due to the weight of the apparatus, and the secondary battery is charged by supplying power via the contact member and the electrode.

11. The charging method according to claim 10, characterized in that if the engaging section engages with the engaged section when the apparatus is mounted on the battery charger, the electrode makes contact with the contact member at a position between a perpendicular line passing through a center of gravity of the apparatus and the engaging section.

* * * * *